(12) United States Patent
Arias

(10) Patent No.: US 6,938,478 B2
(45) Date of Patent: Sep. 6, 2005

(54) IMPEDANCE LEVEL METER FOR LIQUIDS IN TANKS

(76) Inventor: Herman Diaz Arias, Blvd. Condado de Sayavedra, #99, Atizapan, Estado de Mexico (MX), 52938

(*) Notice: Subject to any disclaimer, the term of this patent is extended or adjusted under 35 U.S.C. 154(b) by 241 days.

(21) Appl. No.: 10/294,970

(22) Filed: Nov. 14, 2002

(65) Prior Publication Data

US 2004/0093943 A1 May 20, 2004

(51) Int. Cl.[7] ............................................. G01F 23/00
(52) U.S. Cl. ................................. 73/304 R; 73/290 R
(58) Field of Search .......................... 73/290 R, 304 R, 73/304 C

(56) References Cited

U.S. PATENT DOCUMENTS

| | | | |
|---|---|---|---|
| 1,963,330 A | 6/1934 | Lumme | 73/37 |
| 2,127,422 A | 8/1938 | Phaneuf | 177/311 |
| 3,148,542 A | 9/1964 | Clift, Jr. | 73/308 |
| 3,824,587 A | 7/1974 | Fowler | 340/347 |
| 3,949,606 A | 4/1976 | Blancett | 73/229 |
| 4,051,726 A | 10/1977 | Hastbacka | 73/290 |
| 4,065,968 A | 1/1978 | Sunagawa | 73/313 |
| 4,090,092 A | 5/1978 | Serrano | 307/116 |
| 4,134,022 A | 1/1979 | Jacobsen | 250/577 |
| 4,242,590 A | 12/1980 | von Tlück | 250/577 |
| 4,290,059 A | 9/1981 | Noyes et al. | 340/624 |
| 4,354,180 A | 10/1982 | Harding | 340/619 |
| 4,422,328 A | 12/1983 | Luchessa et al. | 73/313 |
| 4,427,132 A | 1/1984 | Thomson | 222/23 |
| 4,433,577 A | 2/1984 | Khurgin et al. | 73/290 |
| 4,459,584 A | 7/1984 | Clarkson | 340/624 |
| 4,598,742 A | 7/1986 | Taylor | 141/95 |
| 4,638,305 A | 1/1987 | Sutton | 340/620 |
| 4,688,028 A | 8/1987 | Conn | 340/615 |
| 4,706,203 A | 11/1987 | Ramsdale et al. | 364/509 |

(Continued)

FOREIGN PATENT DOCUMENTS

| | | | |
|---|---|---|---|
| GB | 2 147 697 A | 5/1985 | ........... G01F/23/00 |
| WO | WO 00/2015 | 1/2000 | |

OTHER PUBLICATIONS

Notification of Transmittal of International Search Report mailed Sep. 19, 2001 corresponding to International Appln. No. PCT/US 01/40816 filed May 25, 2001.

Notification of Transmittal of International Search Report mailed Sep. 16, 2002 corresponding to International Appln. No. PCT/US 01/50966 filed Nov. 6, 2001.

Notification of Transmittal of International Search Report mailed Apr. 10, 2003 corresponding to International Application No. PCT/IB02/05314 filed Dec. 12, 2002.

Notification of Transmittal of International Search Report mailed Jul. 18, 2003 corresponding to International Application No. PCT/US01/05966 filed Nov. 6, 2001.

*Primary Examiner*—Hezron Williams
*Assistant Examiner*—Rodney Frank
(74) *Attorney, Agent, or Firm*—Baker Botts L.L.P.

(57) ABSTRACT

A method and a system for detecting the level of fluid in a container is provided: The level meter includes first, second and third generally parallel probes being positioned within the container. The first probe includes a first portion that is at least partially covered by an insulating material, and a second generally exposed end. The second probe is generally free of the insulating material and the third probe provides an electrical ground. An electronic unit is operable to measure electrical characteristics of the first and second probes to determine an amount of the second probe which is exposed to a fluid within the container.

24 Claims, 4 Drawing Sheets

U.S. PATENT DOCUMENTS

| | | | |
|---|---|---|---|
| 4,723,122 A | 2/1988 | Maltby et al. | 340/870.38 |
| 4,786,846 A | 11/1988 | Uchida | 318/482 |
| 4,859,987 A | 8/1989 | Markus | 340/625 |
| 4,873,863 A | 10/1989 | Bruhl et al. | 73/49.2 |
| 4,879,902 A * | 11/1989 | Loniello | 73/304 R |
| 4,888,989 A | 12/1989 | Homer | 73/304 |
| 4,912,976 A | 4/1990 | Labriola, II | 73/290 |
| 4,950,998 A | 8/1990 | Kramer et al. | 324/674 |
| 4,977,528 A | 12/1990 | Norris | 364/571 |
| 4,983,855 A | 1/1991 | Grimes | 250/577 |
| 4,989,970 A | 2/1991 | Campbell et al. | 356/73 |
| 5,035,581 A | 7/1991 | McGuire et al. | 417/36 |
| 5,042,299 A | 8/1991 | Wells | 73/304 |
| 5,043,912 A | 8/1991 | Reus | 364/509 |
| 5,073,720 A | 12/1991 | Brown | 250/577 |
| 5,105,085 A | 4/1992 | McGuire et al. | 250/343 |
| 5,117,693 A | 6/1992 | Duksa | 73/317 |
| 5,136,883 A | 8/1992 | Jannotta | 73/309 |
| 5,154,079 A | 10/1992 | Lupoli | 73/308 |
| 5,156,048 A | 10/1992 | DeFigueiredo | 73/308 |
| 5,238,369 A * | 8/1993 | Farr | 417/18 |
| 5,251,482 A | 10/1993 | Bates et al. | 73/290 |
| 5,257,090 A | 10/1993 | Meinzer et al. | 356/358 |
| 5,265,032 A | 11/1993 | Patel | 364/509 |
| 5,275,951 A | 1/1994 | Chow et al. | 436/50 |
| 5,279,157 A | 1/1994 | Mattis et al. | 73/290 |
| 5,297,423 A | 3/1994 | Keating et al. | 73/49 |
| 5,309,212 A | 5/1994 | Clark | 356/5 |
| 5,351,036 A | 9/1994 | Brown et al. | 340/618 |
| 5,351,548 A | 10/1994 | Briggs | 73/718 |
| 5,502,377 A | 3/1996 | Freund | 324/175 |
| 5,535,625 A | 7/1996 | Levy | 73/290 |
| 5,539,670 A | 7/1996 | Maltby et al. | 364/550 |
| 5,609,059 A | 3/1997 | McEwan | 73/290 |
| 5,636,548 A | 6/1997 | Dunn et al. | 73/313 |
| 5,642,097 A | 6/1997 | Martel | 340/618 |
| 5,648,844 A | 7/1997 | Clark | 356/5.09 |
| 5,705,733 A | 1/1998 | Jannotta | 73/1 |
| 5,742,055 A | 4/1998 | Lee | 250/353 |
| 5,747,824 A | 5/1998 | Jung et al. | 250/577 |
| 5,751,611 A | 5/1998 | Jamieson | 364/573 |
| 5,755,136 A | 5/1998 | Getman et al. | 73/290 |
| 5,842,374 A | 12/1998 | Chang | 73/290 |
| 5,880,480 A | 3/1999 | Ellinger et al. | 250/577 |
| 5,895,848 A | 4/1999 | Wilson et al. | 73/290 |
| 5,975,102 A | 11/1999 | Schalk | 137/2 |
| 6,040,897 A | 3/2000 | Clifford et al. | 356/4.01 |
| 6,052,190 A | 4/2000 | Sckowski et al. | 356/376 |
| 6,125,696 A * | 10/2000 | Hannan et al. | 73/304 C |
| 6,239,709 B1 | 5/2001 | Dykstra et al. | 340/618 |
| 6,253,610 B1 | 7/2001 | Struzik et al. | 73/313 |
| 6,272,911 B1 | 8/2001 | Hinkle | 73/118 |
| 6,336,362 B1 | 1/2002 | Duenas | 73/313 |

* cited by examiner

US 6,938,478 B2

IMPEDANCE LEVEL METER FOR LIQUIDS IN TANKS

TECHNICAL FIELD OF THE INVENTION

The present invention relates generally to measurement devices, and more particularly, to an impedance level meter for liquids in tanks.

BACKGROUND OF THE INVENTION

Level metering is used in a vast number of applications to monitor the level of liquid, gas or other material in a container. In the gas industry, for example, a widely used level measuring device is float level meter. This type of meter requires the installation of a float inside the tank. The float is connected to the body of the meter by a metal arm. The arm allows the position of the interface between liquified gas and gas which is in a gaseous state to be monitored. The movement of the float is translated to a rotational displacement by the arm. The displacement of the arm requires quite a bit of space, making it difficult to use this type of level meter in small tanks (e.g., gas grill and portable tanks). Float level meters are also not effective in portable applications because of the sensitivity of the sensors to movement. Furthermore, with regard to vertical portable LP gas tanks, the small diameter of the containers makes it difficult or impossible to use float level meters.

SUMMARY OF THE INVENTION

The present invention provides a level meter and method of level metering for materials contained in tanks that substantially eliminates or reduces at least some of the disadvantages and problems associated with the previous level meters and methods.

In accordance with a particular embodiment of the present invention, a level meter includes first, second and third generally parallel probes that are positioned within a container. The first probe includes a first portion that is covered by an insulating material, and a second generally exposed end. The second probe is generally free of insulating material. The third probe provides an electrical ground. An electronic unit is also provided that is operable to measure electrical characteristics of the first and second probes, and liquid adjacent exposed areas of the probes and ground, to determine a length of the second probe which is exposed to a fluid within the container.

In accordance with another embodiment of the present invention, a method for detecting a level of fluid in a container includes installing first, second and third generally parallel probes within a container. In this embodiment, the first probe also includes a first portion at least partially covered by an insulating material, and a second generally exposed end. The second probe is generally free of the insulating material and the third probe is an electrical ground. The method further includes measuring electrical characteristics of the first and second probes to determine a length of the second probe that is exposed to a fluid within the container, using an electronic unit.

Technical advantages of particular embodiments of the present invention include an electronic measuring device that may be used to measure the level of practically any fluid in a container, using the electrical properties of the fluid to generate a frequency signal containing information about the level, in its duty-cycle. Such an electronic measuring device does not require calibration to be used in different fluids, and in different applications.

Another technical advantage of particular embodiments of the present invention is a level meter that is versatile and able to easily transmit its output by a coaxial cable or radio frequency, Furthermore, the output of the level meter can be converted to a digital number or an analog level directly.

Yet another technical advantage of particular embodiments of the present invention is a level meter which may employ various types of sensing elements. For example, the conductors (e.g., probes) can be metal rods, or ribbons of printed circuit materials etched and processed as PC boards. The conductors and related electronics may be placed on a one-piece probe or may be separated using a connector.

Still another technical advantage of particular embodiments of the present invention includes a level meter sensor that is immune to changes in temperature or fluid characteristics. The ratio-metric operation of the sensor provides this immunity to temperature and/or other characteristics of the fluid.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF THE INVENTION

Figure 1:
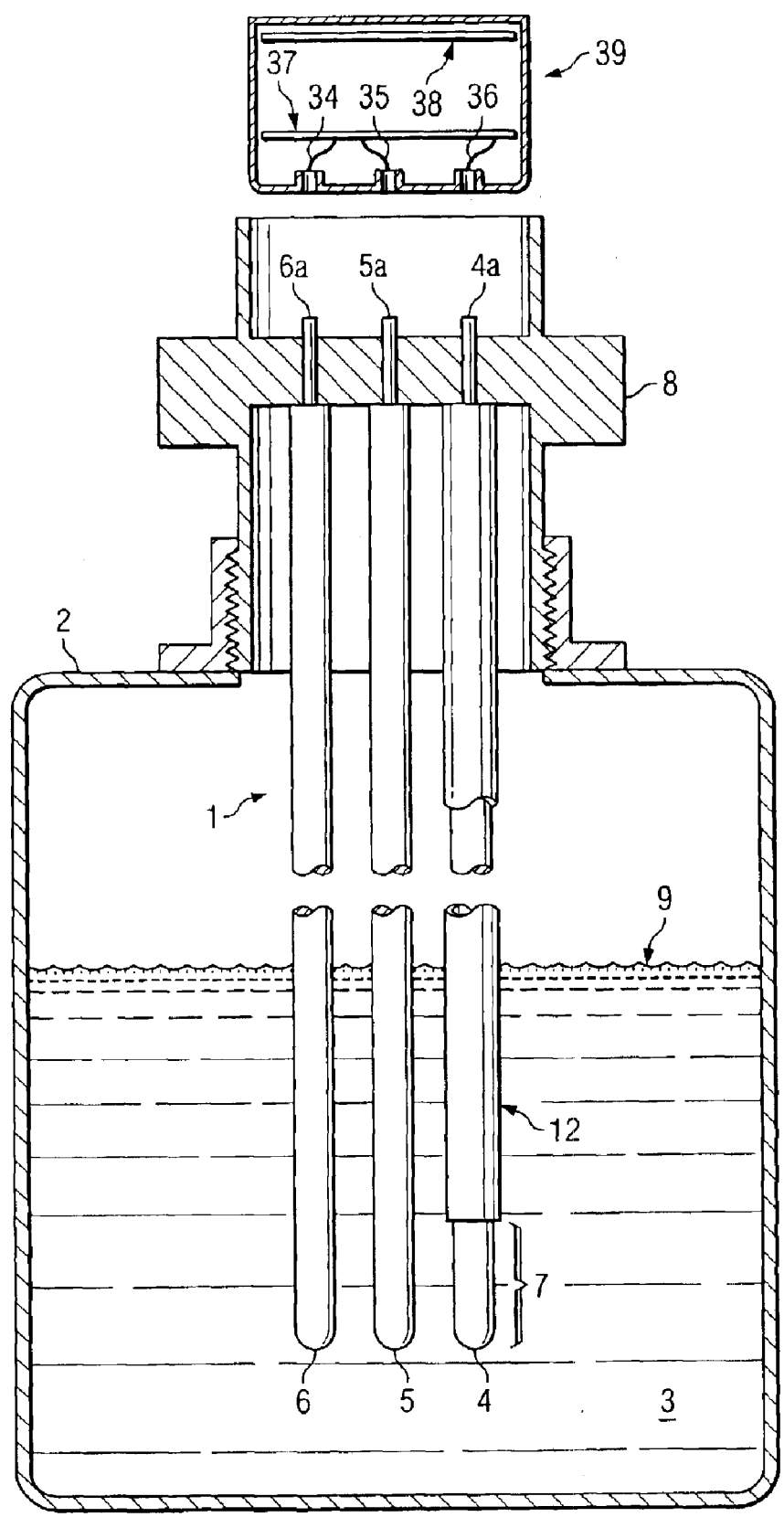
FIG. 1 is a schematic diagram illustrating a level meter installed within a container, in accordance with a particular embodiment of the present invention.

FIG. 1 illustrates a level meter 1, in accordance with a particular embodiment of the present invention. Level meter 1 includes three elongate rod probes 4, 5 and 6. Probes 4, 5 and 6 each extends into a tank, or container 2. Container 2 is partially filled with a fluid 3. Reference number 9 designates the level of fluid 3 within container 2. Level meter 1 may be used to determine the level 9 of fluid 3 within container 2, in accordance with aspects of the present invention.

Rod probe 4 is partially covered with an insulator 12, which protects and insulates portions of rod probe 4 that are adjacent to insulator 12. Rod probe 4 also includes an uninsulated portion 7, at a lower end of rod probe 4. Rod probe 6 is uninsulated along its entire length.

Rod probe 5 provides a ground. In various embodiments of the present invention, metal rod probes 4, 5 and/or 6 may be anodized rods.

In accordance with the teachings of the present invention, uninsulated portion 7 of rod probe 4 is used as a reference, and level 9 of fluid 3 in container 2 is determined by calculating how much of non-insulated rod probe 6 is covered by fluid 3, compared with the length of uninsulated portion 7 of rod probe 4. This ratio-metric determination of the level 9 of fluid 3 makes level meter 1 independent of temperature and other fluid characteristics.

Level meter 1 includes a metal body cap 8 that is installed adjacent the top of tank 2. Rod probes 4, 5 and 6 pass through metal body cap 8, and the anodization provides the necessary insulation between rod probes 4, 5 and 6. In this embodiment, the respective tips 4a, 5a, and 6a, of rod probes 4, 5 and 6 may be sanded to provide conductivity thereto.

Level meter 1 also includes a plastic electronic unit 39. Electronic unit 39 is connected to rod probes 4, 5 and 6 using spring connectors 34, 35 and 36, respectively. Spring connectors 34, 35 and 36 are mounted directly on a PC board 37. A liquid crystal display 38 is also coupled with electronic unit 39. The liquid crystal display 38 provides alphanumeric information to an operator through a generally transparent portion of electronic unit 39.

Figure 2:
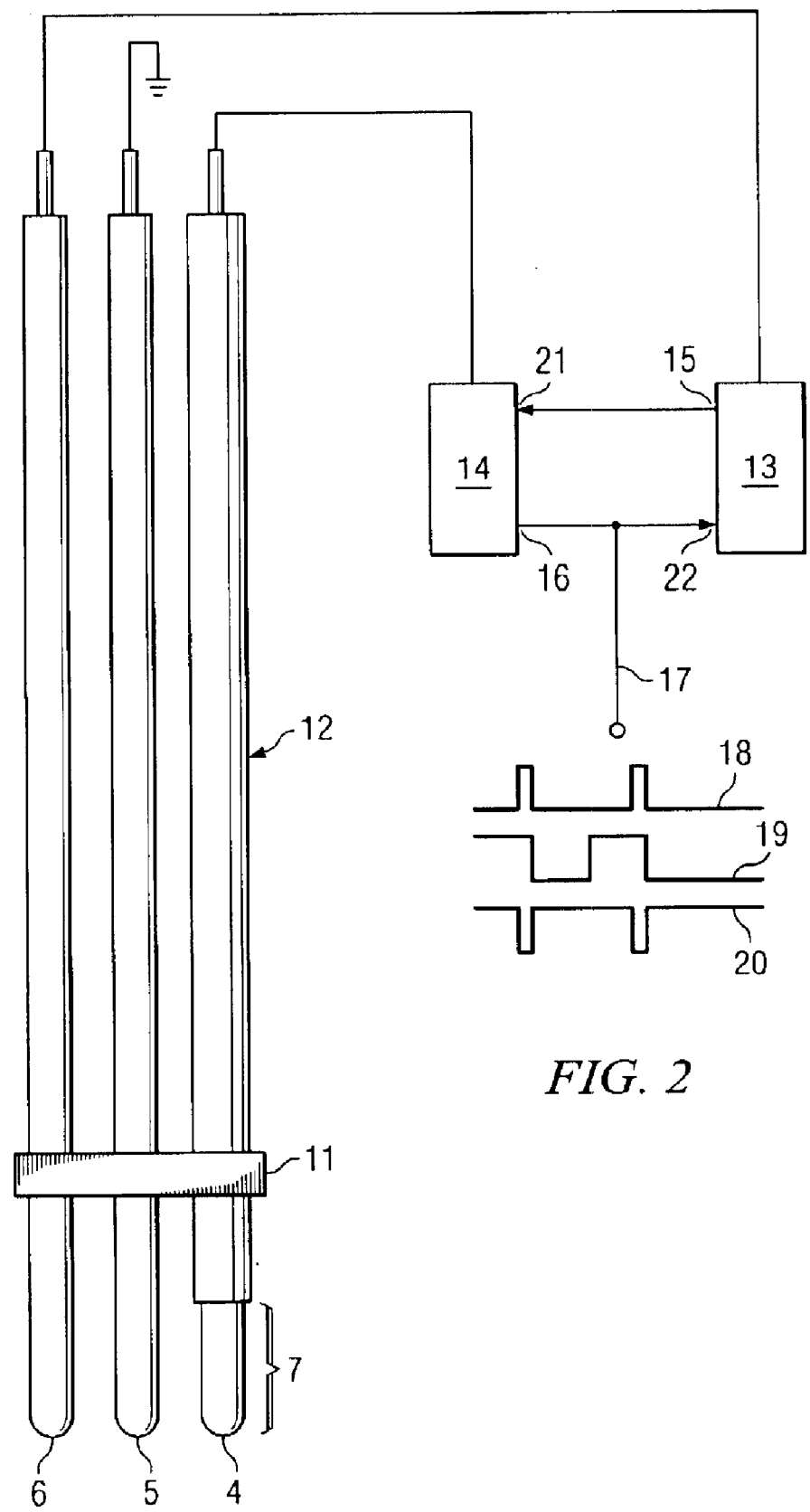
FIG. 2 illustrates a wiring diagram suitable for use with the level meter of FIG. 1, in accordance with a particular embodiment of the present invention.

FIG. 2 illustrates the operation of level meter 1, in accordance with a particular embodiment of the present invention. As illustrated in FIG. 2, ground rod probe 5 is coupled to the ground of an electronic circuit, or to any other stable voltage. Rod probes 4 and 6 are electrically coupled to the time setting input of monostable multivibrators 13 and 14, respectively. Each monostable multivibrator 13 and 14 includes an associated trigger 22 and 21, respectively. Triggers 21 and 22 are electrically coupled to outputs 15 and 16 of multivibrators 13 and 14, respectively. The circuit formed by these components of level meter 1 generates the type of waveforms illustrated in FIG. 2.

Waveforms 18, 19 and 20 of FIG. 2 illustrate three level "conditions." Waveform 19 illustrates a fifty percent fluid level. Waveform 18 illustrates a ninety percent fluid level. Waveform 20 illustrates a ten percent fluid level. In accordance with this embodiment of the present invention, the reference rod probe (rod probe 4) should be "wet," since measurements are unreadable below that level.

Rod probes 4, 5 and 6, of the illustrated embodiment, are each made of a metal that is treated chemically to make rod probes 4, 5 and 6 partially insulated. In a particular embodiment, rod probes 4, 5 and 6 may be made of aluminum. In this embodiment, anodizing provides a strong electric insulation from solid materials, but liquids may penetrate the anodization. This will lower the impedance between the liquid surrounding the rod probe, and the center of the rod.

Since rod probes 4, 5 and 6 are anodized, they may penetrate metal body cap 8 without short circuiting with the other rod probes or metal body cap 8. Outer diameters of the anodized rod probes are equal to the inner diameter of holes through metal body cap 8. In accordance with a particular embodiment of the present invention, the holes may be expanded using heat to allow the rod to penetrate through the cap. However, when the temperature dissipates, a very tight seal and electric insulation is provided. In FIG. 2, a separator 11 is used to maintain distance between rod probes 4, 5 and 6.

The level sensing technology employed within the teachings of the present invention uses a differential measuring technique to relate height of a fluid 3 inside a container 2 with the impedance between a sensing rod probe 6 and a ground rod probe 5. The impedance is measured and compared with the impedance between the ground rod probe 5, and the small exposed, or uninsulated portion 7 of the reference rod probe 4. Again, reference rod probe 4 is highly insulated along its entire length, except for a small exposed area (uninsulated portion 7). An output pulse width modulation is generated to provide information regarding how much of sensing rod probe 6, is covered by the fluid 3, expressed as a multiple of the length of uninsulated portion of rod probe 4. In some embodiments, the reference rod may be eliminated for example, if the container is metallic and the fluid impedance is low.

In accordance with a particular embodiment of the present invention, the reference height (e.g., uninsulated portion 7 of rod probe 4) must be covered by fluid in order for level meter 1 to function properly. Accordingly, no measures may be taken below the lowest level of insulator 12. However, these techniques are very inexpensive to employ and provide reliable level metering. A single level meter incorporating the technology described herein may be used to measure the level of any liquid in a container, without changing any components, configuration or other aspects of the level meter.

In accordance with another aspect of the present invention, a small constant impedance between rod probes 4, 5 and/or 6 may be caused by parasitic electrical elements that cannot be completely eliminated during the manufacturing process of level meter 1. Straight capacitances generated by the insertion of rod probes 4, 5 and/or 6 through metal end cap 8 may be compensated for, using the teachings of the present invention. One such technique is described with reference to FIG. 3.

Figure 3:
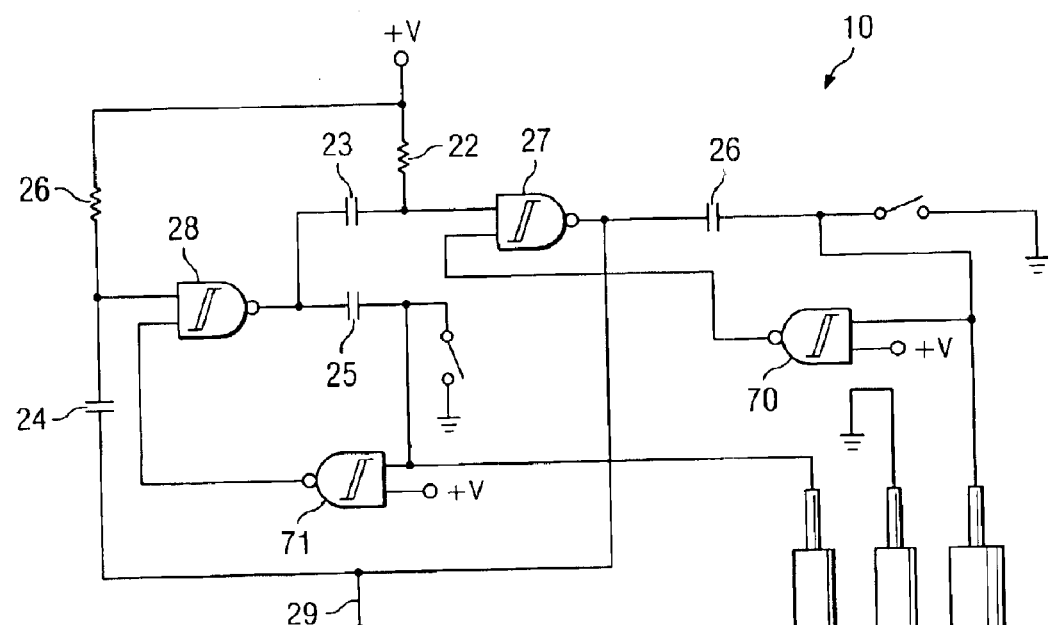
FIG. 3 illustrates further details regarding a wiring diagram suitable for use with the level meter of FIG. 1, illustrating various aspects of the present invention.

FIG. 3 illustrates a circuit 10 that is operable to generate pulse width modulated signals that contain information regarding the level 9 of fluid 3 in container 2. Electronic NAND gates of FIG. 3 have Schmidt trigger inputs. It is desirable that such gates be free of input protecting diodes. Otherwise, an unbalance of charge interchange between rod probes 4 and 6 may cause molecular migration. This would have a tendency to alter the electrical properties in the surface of rod probes 4 and 6. As illustrated in FIG. 3, reference rod probe 4 and sensing rod probe 6 are electrically coupled to respective inputs of corresponding ultra high impedance NAND gates 70 and 71, respectively.

Following along circuit 10, NAND gates 70 and 71 are electrically coupled by capacitors 26 and 25, respectively, to the outputs of NAND gates 27 and 28, respectively. These outputs can vary from approximately ground to a predetermined supply voltage. For example, if the output of NAND gate 27 is at +V, a current flow by capacitor 26 will charge at a speed proportional to the impedance between reference rod probe 4 and ground rod probe 5. When the level at the input of NAND gate 70 reaches the low input level threshold, the output of NAND gate 70 goes high. This makes the output of NAND gate 27 low. The high to low transition of NAND gate 27 described above, is used to trigger a second monostable circuit.

A small capacitor 24 and resistor 26 convert the high to low output step from NAND gate 27 to a small pulse that occurs at the input of NAND gate 28. The output of NAND gate 28 goes high and a charge process of capacitor 25 is initiated. The charge process proceeds at a pace established by the impedance between sensing rod probe 6 and ground rod probe 5.

When the voltage at NAND gate 71 input reaches the low threshold level, the output of NAND gate 71 will go high and a new period at the output of NAND gate 27 is initiated. This is due to the fact that the monostable multivibrator formed by NAND gate 27 and NAND gate 70 will be retriggered by the high to low-level transition of NAND gate 28.

In accordance with a particular embodiment of the present invention, capacitors 25 and 26 should be very small and have a very high internal resistance. If the frequency of isolation is low, an almost completely transient RC circuit can be considered during the charge-discharge process of capacitors 25 and 26. If the output frequency is very high, capacitance and inductance of the liquid are important. However, these conditions should not affect the duty cycle information of the output.

High-speed discharge circuitry for capacitor 26 may be used to insure that the voltage across capacitor 26 will be zero when the trigger signal from NAND gate 28 arrives. The charge time of capacitor 26 should always be larger than the charge time of capacitor 25. Capacitor 26 may be discharged more quickly if the output of NAND gate 27 can swing below ground during a small time frame.

Figure 4:
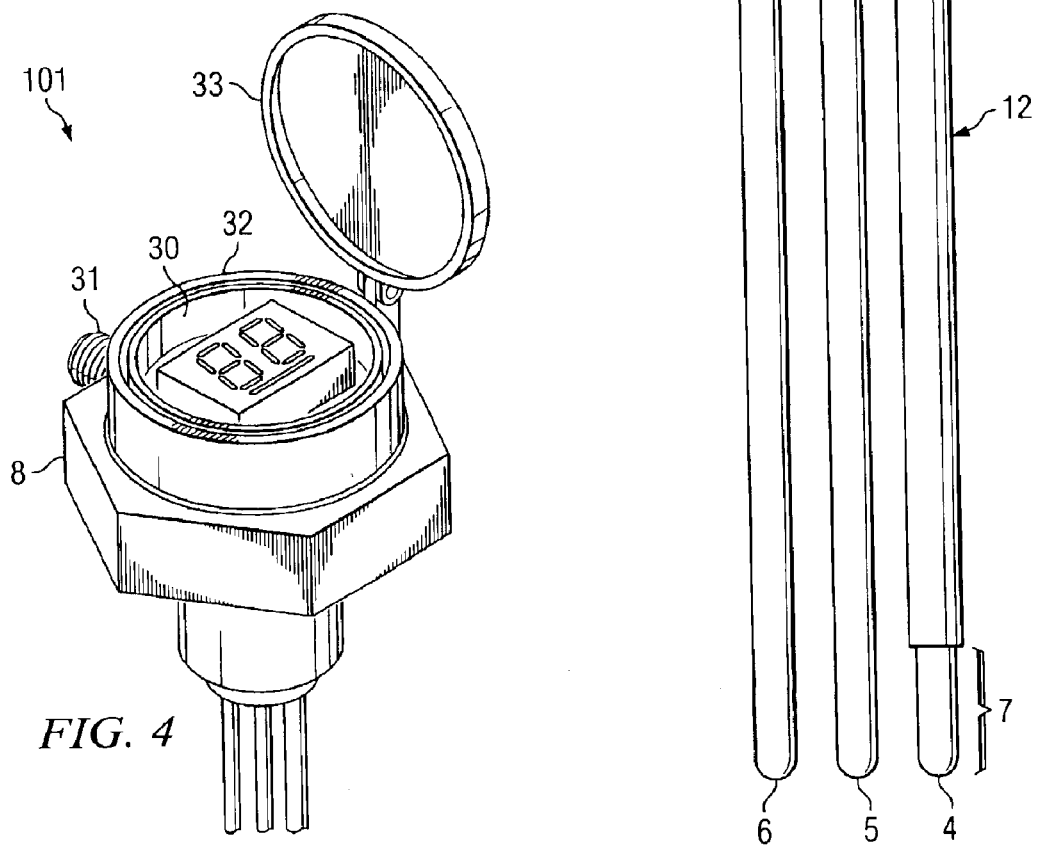
FIG. 4 illustrates a level meter having a digital readout, in accordance with a particular embodiment of the present invention.

FIG. 4 illustrates a level meter 1, in accordance with another embodiment of the present invention. Level meter 101 includes a two-digit display 30. Display 30 is used to provide information (readings) to an operator of level meter 101. Level meter 101 also includes an output connector 31 for coaxial cable. In the illustrated embodiment, output connector 31 comprises a 75 Ohms output connector. A protection lid 33 is provided to protect level meter 101 and its components from the elements (rain and sun), and ambient environmental conditions.

In alternative embodiments of the present invention, connector 31 may be modified to communicate with a remote location using a medium other than coaxial cable. For example, twisted pair, ethenet or other type of conductor may be used to transmit information to a remote location. Similarly, level meter 101 may employ radio frequency (RF) signals to communicate information to a remote location.

Figure 5:
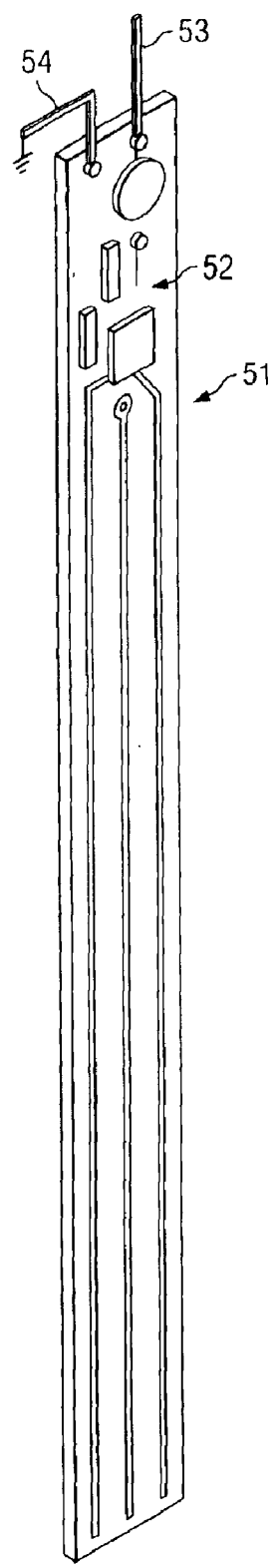
FIG. 5 illustrates a printed circuit board (PCB) ribbon having probes etched thereupon, in accordance with another embodiment of the present invention.

FIG. 5 illustrates an embodiment of the present invention, wherein rod probes 4, 5 and 6 are replaced by a printed circuit board (PCB) ribbon 51. PCB ribbon 51 includes three conductors 50 that extend approximately parallel with one another along PCB ribbon 51. In the illustrated embodiment, conductors 50 are each separated by a distance of one to five millimeters. Therefore, in this embodiment, most of the electronic circuits of the level meter may be placed upon the same printed circuit board ribbon.

In FIG. 5, conductors 50 are placed, printed and etched upon PCB ribbon 51. Pulse width modulation circuitry 52 is also imprinted on the same PCB ribbon 51. Using printed conductors instead of rods may provide advantages, within the teachings of the present invention. For example, only one conductor 53 must extend through metal body cap 8. This can be very useful if the pulse width modulated output is intended to be sent to a remote monitoring device.

The power supply for the inner circuitry of PCB ribbon 51 and output signal can share the same wire, in the embodiment of FIG. 5. PCB ribbon 51 also includes a ground wire 54. Ground wire 54 may be connected to the electronics reference to the metal body of the sensor.

Figure 6:
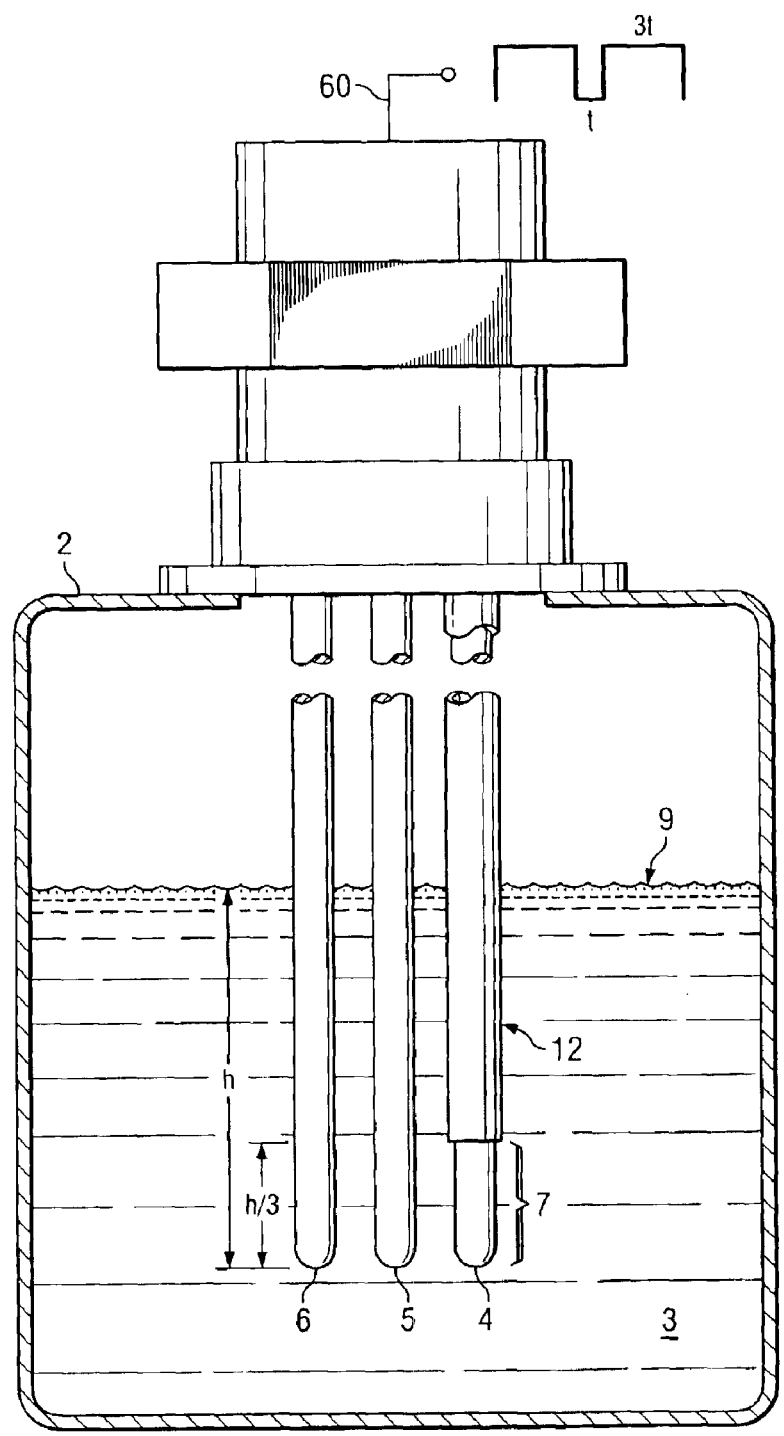
FIG. 6 illustrates an example system and method for detecting the level of fluid in a container, in accordance with a particular embodiment of the present invention.

FIG. 6 illustrates portions of level meter 1, in accordance with a particular embodiment of the present invention. Reference probe 4 of FIG. 6 is covered by insulation material 12. Rod probe 4 includes an exposed area, or uninsulated portion 7. The length of uninsulated portion 7 should be covered by the liquid 3 at all times, and will be considered the reference height. The exposed conducting material of uninsulated portion 7 is used to measure the electrical impedance with respect to ground rod probe 5. This impedance depends on the capacitance, resistance and inductance between the reference rod probes' 4 exposed area (uninsulated portion 7) and ground. All of these factors are affected by the electrical properties of liquid 3, the geometry of reference sensing electrodes (rod probe 4 and ground rod probe 5), the wet surfaces, and the temperature.

In the illustrated embodiment, the level 9 of liquid 3 is approximately a distance h above the bottom of rod probe 4, as shown in FIG. 6. For purposes of this example, it is assumed that height h is equal to three times the length of uninsulated portion 7 of rod probe 4. Therefore, impedance approximately equal to one third of that measure in reference rod probe 4 can be measured between sensing rod probe 6 and ground rod probe 5. The output frequency 60 contains the information regarding how many times the reference length (h/3 in the illustrated embodiment) is covered by liquid along the sensing rod.

Although embodiments of the invention and their advantages are described in detail, a person skilled in the art could make various alterations, additions, and omissions without departing from the spirit and scope of the present invention, as defined by the appended claims.

What is claimed is:

1. A level meter, comprising:

first, second and third generally parallel probes being positioned within a container;

the first probe having a first portion at least partially covered by an insulating material, and a second generally exposed end;

the second probe being generally free of the insulating material and the third probe being an electrical ground; and an electronic unit being operable to measure electrical characteristics of the first and second probes to determine a length of the second probe that is exposed to a fluid within the container.

2. The level meter of claim 1, further comprising a metal body cap coupled with a top portion of the container, the first, second and third probes extending through the metal body cap.

3. The level meter of claim 1, further comprising first, second and third spring connectors being operable to couple the first, second and third probes, respectively, with the electronic unit.

4. The level meter of claim 3, wherein the electronic unit further comprises a printed circuit board, and wherein the first, second and third spring connectors are operable to couple the first, second and third probes, respectively, with the printed circuit board.

5. The level meter of claim 4, further comprising a liquid crystal display being operable to display information regarding a level of the fluid within the container.

6. The level meter of claim 1, wherein the first, second and third probes are anodized.

7. The level meter of claim 1, wherein the first probe is electrically coupled with a first monostable multivibrator, and the second probe is electrically coupled with a second monostable multivibrator.

8. The level meter of claim 7, wherein the first and second monostable multivibrators comprise first and second triggers, respectively, the first trigger being electrically coupled with an output of the second monostable multivibrator, and the second trigger being electrically coupled with the an output of the first monostable multivibrator.

9. The level meter of claim 8, further comprising a circuit formed, at least in part, by the first and second monostable multivibrators, the circuit being operable to generate waveforms that correspond to the level of fluid.

10. The level meter of claim 1, wherein the first, second and third probes each comprise a metal or metal alloy, and each of the first, second and third probes are at least partially treated with a chemical to provide partial insulation thereto.

11. The level meter of claim 1, further comprising a printed circuit ribbon, wherein the first, second and third probes are formed upon the printed circuit ribbon.

12. The level meter of claim 11, wherein the printed circuit ribbon further comprises pulse width modulation circuitry.

13. The level meter of claim 12, wherein a distance between the first probe and the third probe, and between the second probe and the third probe comprises approximately between one and five millimeters.

14. A method for detecting a level of fluid in a container, comprising:

installing first, second and third generally parallel probes within a container;

the first probe having a first portion at least partially covered by an insulating material, and a second generally exposed end;

the second probe being generally free of the insulating material, and the third probe providing an electrical ground; and measuring electrical characteristics of the first and second probes to determine a length of the second probe that is exposed to a fluid within the container.

15. The method of claim 14, wherein the first, second and third probes extend through a metal body cap that seals the container from ambient environment.

16. The method of claim 14, wherein the level meter further comprises an electronic unit, and further comprising coupling the first, second and third probes with the electronic unit using first, second and third spring connectors.

17. The method of claim 16, further comprising displaying information regarding a level of fluid within the container, using a liquid crystal display that is electrically coupled with the electronic unit.

18. The method of claim 14, further comprising chemically treating the first, second and third probes to provide partial insulation thereto.

19. The method of claim 14, further comprising anodizing the first, second and third probes.

20. The method of claim 14, further comprising electrically coupling the first probe with a first monostable multivibrator, and electrically coupling the second probe with a second monostable multivibrator.

21. The method of claim 20, further comprising electrically coupling a first trigger associated with the first monostable multivibrator with an output of the second monostable multivibrator, and electrically coupling a second trigger associated with the second monostable multivibrator, with an output of the first monostable multivibrator.

22. The method of claim 21, further comprising generating waveforms that correspond to the level of fluid using a circuit formed, at least in part, by the first and second monostable multivibrators.

23. The method of claim 14, further comprising forming the first, second and third probes upon a printed circuit ribbon.

24. A level meter for detecting a level of fluid having a relatively low impedance, within a container, comprising:

first and second generally parallel probes being positioned within a container;

the first probe having a first portion at least partially covered by an insulating material, and a second generally exposed end, and the second probe being generally free of the insulating material; and an electronic unit being operable to measure electrical characteristics of the first and second probes, to determine a length of the second probe that is exposed to a fluid having a relatively low impedance, within the container.

* * * * *